United States Patent [19]
Jones et al.

[11] 3,904,584
[45] Sept. 9, 1975

[54] CROSSLINKED POLYQUINOXALINE POLYMERS

[75] Inventors: Robert J. Jones, Hermosa Beach; Michael K. O'Rell, Manhattan Beach, both of Calif.

[73] Assignee: TRW Inc., Redondo Beach, Calif.

[22] Filed: Oct. 31, 1973

[21] Appl. No.: 411,511

[52] U.S. Cl. ........... 260/47 UA; 260/33.4 P; 260/49; 260/50; 260/64; 260/65; 260/72.5; 260/347.2; 260/347.3
[51] Int. Cl. ....... C08g 9/04; C08g 9/06; C08g 15/00
[58] Field of Search .......... 260/50, 65, 72.5, 474 A, 260/64, 49, 347.2, 347.3

[56] References Cited
UNITED STATES PATENTS

| | | | |
|---|---|---|---|
| 3,642,700 | 2/1972 | Augl | 260/50 |
| 3,654,226 | 4/1972 | Augl et al. | 260/50 |
| 3,661,850 | 5/1972 | Stille | 260/50 |
| 3,746,687 | 7/1973 | Duffy et al. | 260/50 |

*Primary Examiner*—Lester L. Lee
*Attorney, Agent, or Firm*—Daniel T. Anderson; Alan D. Akers; Willie Krawitz

[57] ABSTRACT

Crosslinked polymers are produced by the reaction of a linear polyquinoxaline containing a pendant furan group with an aromatic olefinic end-capped compound. The polyquinoxaline polymers have an alicyclic endooxy linkage repeated throughout the polymer at the cross-linking sites where the furan end-capped constituent undergoes a Diels-Alder reaction with the aromatic olefinic end-capped crosslinking agent. Subsequently, the alicyclic endooxy linkage may be aromatized by the application of heat to produce a high performance polymer which is suitable for use in severe environments at temperatures up to 400°C.

2 Claims, No Drawings

CROSSLINKED POLYQUINOXALINE POLYMERS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS-REFERENCE TO RELATED APPLICATIONS

The furan end-capped bisglyoxal monomers used in the preparation of the monomers of this invention are disclosed in copending application entitled "Polyquinoxalines and Method of Preparation," Ser. No. 411,513, filed Oct. 31, 1973.

BACKGROUND OF THE INVENTION

Polyquinoxalines have been prepared by heating slowly a tetramine and a bisglyoxal in an inert atmosphere at about 250°C. The resulting polymer produced by this method is more insoluble than polyquinoxalines produced using other methods. When a solvent medium is employed, equimolar amounts of a bisglyoxal and a tetramine are reacted at elevated temperatures under an inert atmospere, and the polymer precipitates from solution.

Generally, polyquinoxalines have been synthesized from bisglyoxal which had either a hydrogen or phenylene radical end-cap. Polyquinoxalines which had the hydrogen radical end-cap on the bisglyoxal exhibited poorer thermal stability but better adhesive qualities than polyquinoxalines having the phenylene end-cap on the bisglyoxal.

Polymer solubility at high linear molecular weights presented another problem for the prior art polyquinoxalines. This is particularly true for the polymer solubility of the polyquinoxalines. However, by proper selection of monomers having flexible connecting groups between the aromatic units, solubility of polyquinoxalines below about 500°C is improved over polyquinoxalines synthesized from monomers having a greater proportion of aromatic units.

SUMMARY OF THE INVENTION

High performance polyquinoxalines are produced by the in situ aromatization of polyquinoxalines which have been crosslinked through an alicyclic endooxy linkage between the backbone chains.

The linear polyquinoxaline is produced by the reaction of an aromatic tetramine with an aromatic furan end-capped bisglyoxal monomer which is subsequently crosslinked with an aromatic olefinic end-capped compound according to the following reaction:

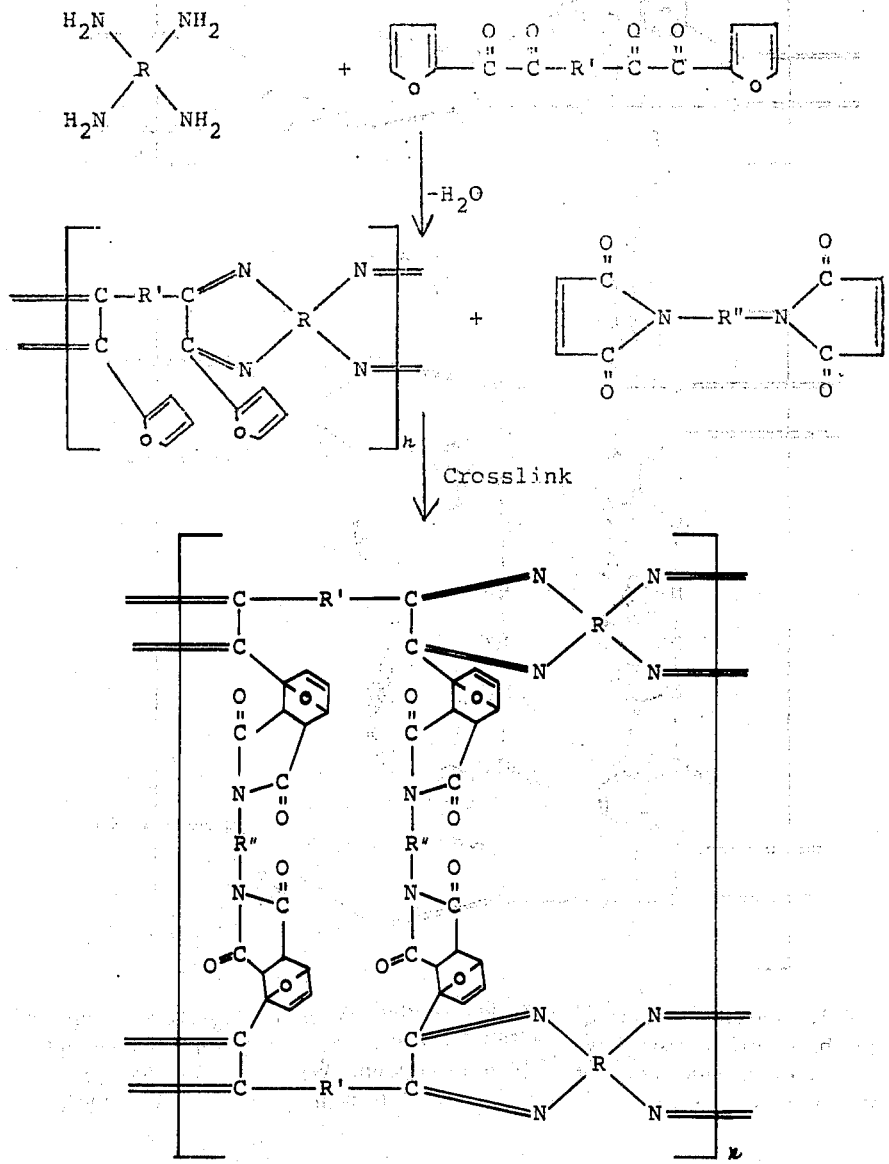

where R is a tetrafunctional aromatic radical and R' and R'' are difunctional aromatic radicals. The intermediate quinoxaline polymer contains an alicyclic endooxy bridge at the crosslink connection to provide a structure having a low melting point which permits easier processability prior to final cure by aromatization. Final cure of the polymer is accomplished by heating to aromatize the endooxy bridge according to the following reaction:

temperature range of between 200°C and 300°C will aromatize the endooxy coupling in situ to produce a crosslinked polymer which has thermal stability up to 400°C.

DESCRIPTION OF THE PREFERRED EMBODIMENTS

Crosslinked polyquinoxalines according to the present invention are made by reacting tetramines with bis-

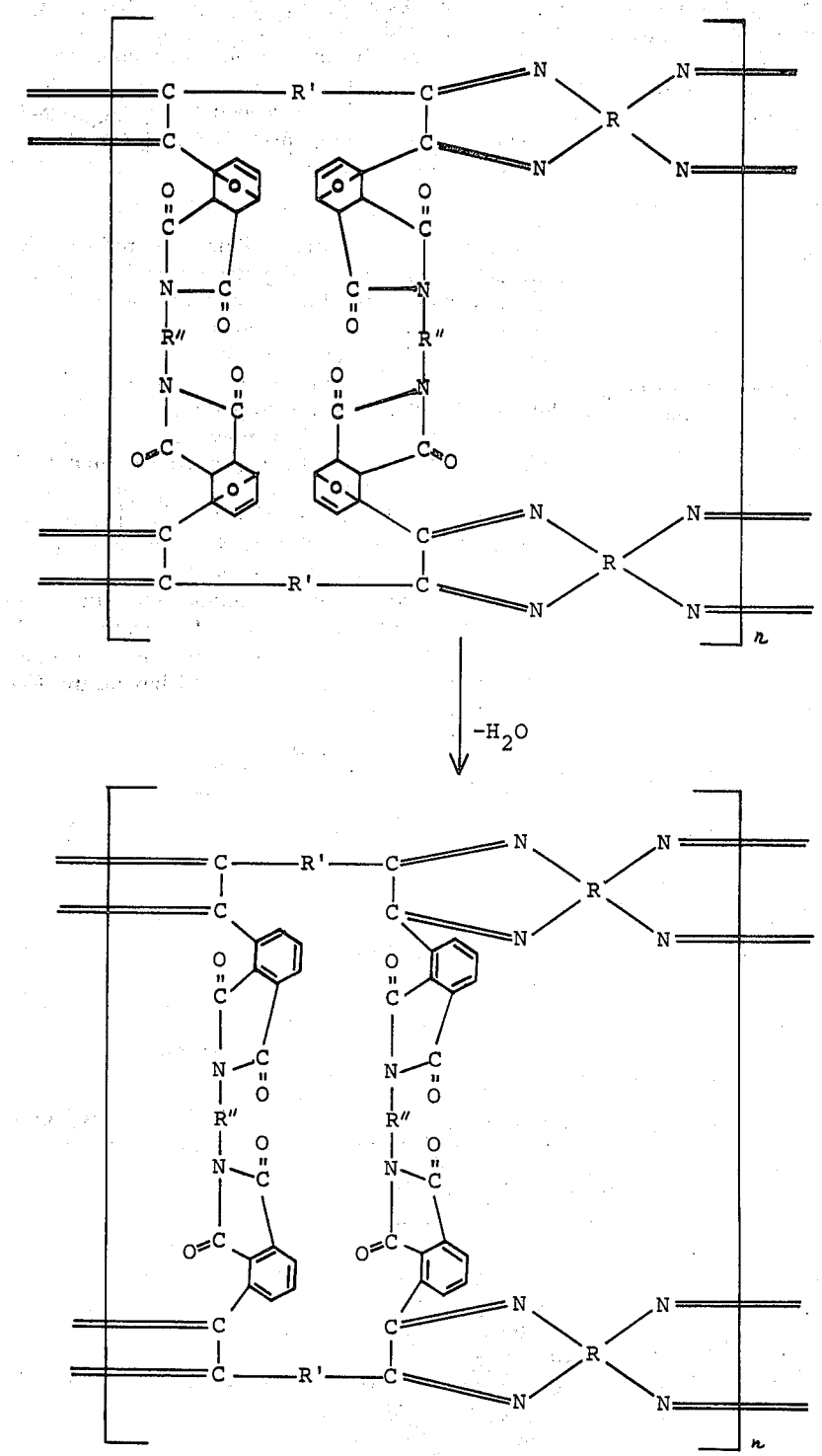

Polyquinoxalines made according to this invention exhibit improved resin flow during fabricating steps as a result of the endooxy structure of the crosslink. When the product fabrication has been effected, heat in the glyoxals which are end-capped with at least one furan radical. The crosslinking is completed by reacting the furan radical with a dienophile, i.e., an olefinic end-capped monomer. Reaction of the diolefin or dienophile with the furan end-caps produces a crosslink between the linear polyquinoxaline chains which is coupled to the linear chains through an alicyclic endooxy linkage. When final fabrication of the polymer is ready, heat is applied to the polymer with the result that the alicyclic endooxy linkage is aromatized with the simultaneous evolution of water.

Crosslinking according to the present invention effectively changes the polymer properties of polyquinoxalines when as little as five percent by mole quinoxaline rings in the polymer have been crosslinked. Thus, crosslinking polyquinoxalines in a range of from 5 percent to 100 percent of the quinoxaline rings will produce substantially improved chemical, thermal, and physical properties.

The polymerization and crosslinking process is initiated by reacting an aromatic tetramine having the structure:

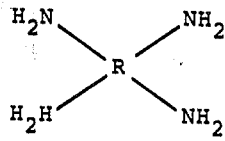

wherein R is a tetrafunctional aromatic radical which may be selected from any of:

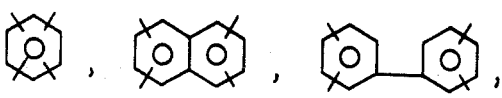

and

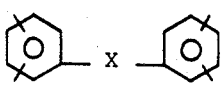

where X is

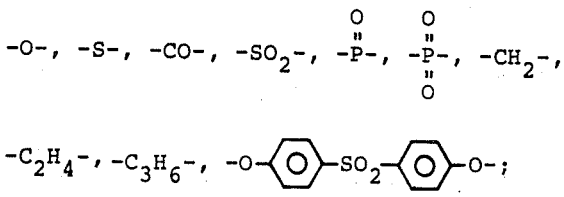

with an equimolar amount of an aromatic bisglyoxal whose structures are illustrated by the following formulas:

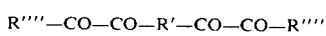

R''''—CO—CO—R'—CO—CO—R''''   (1)

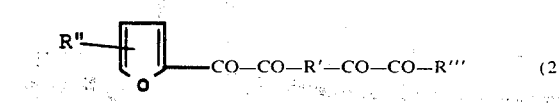

R' in the preceeding formulas is a difunctional aromatic radical which is selected from the following:

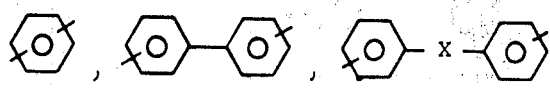

where X is —O—, —S—, —CO—, —SO$_2$—,

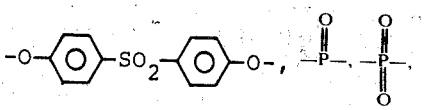

-CH$_2$-, -C$_2$H$_4$-, and -C$_3$H$_6$-; R'' is an optional monofunctional radical in that it may or may not be present as a substituent onto the furan end-cap, but if present, it is either a hydrogen radical or an alkyl radical having one to four carbon atoms; R''' is a monofunctional radical which is selected from the following: -H,

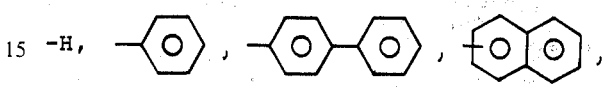

and

and R'''' may be either a hydrogen radical or a phenylene radical. The mount of the nonreactive end-capped bisglyoxals as illustrated by a formula designated (1) can be present in amounts ranging from 0.00 to 0.95 mole fraction, and the bisglyoxal designated as formula (2) ranges from 0.05 to 1.00 mole fraction of the bisglyoxal present in the polymer, the total mole fraction of the two bisglyoxal monomers must amount to 1.00. The polyquinoxaline produced by the reaction of the tetramine and the bisglyoxal monomers is crosslinked by an olefinic end-capped compound having the formula:

Z-R'-Z wherein Z may be either:

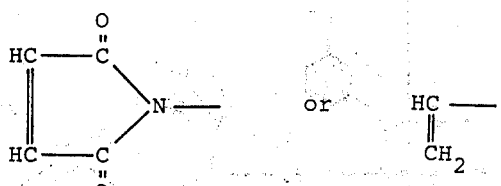

The amount of the diolefin crosslinking agent which is used is equal to the number of furan groups present in the glyoxal monomer, that is, one equivalent weight of the olefinic end-capped compound is used for one equivalent weight of the furan end-capped monomer.

Reaction temperatures for the linear polymerization range from room temperature up to approximately 50°C with the higher temperatures reducing the reaction time. Crosslinking of the polyquinoxaline resins will occur in the temperature range of from 100°C to approximately 300°C. In situ aromatization of the alicyclic endooxy crosslinking coupling with the linear polymer will occur in the temperature range of from 200°C to approximately 300°C.

The polymerization reaction to produce polyquinoxaline polymers may be illustrated as follows:

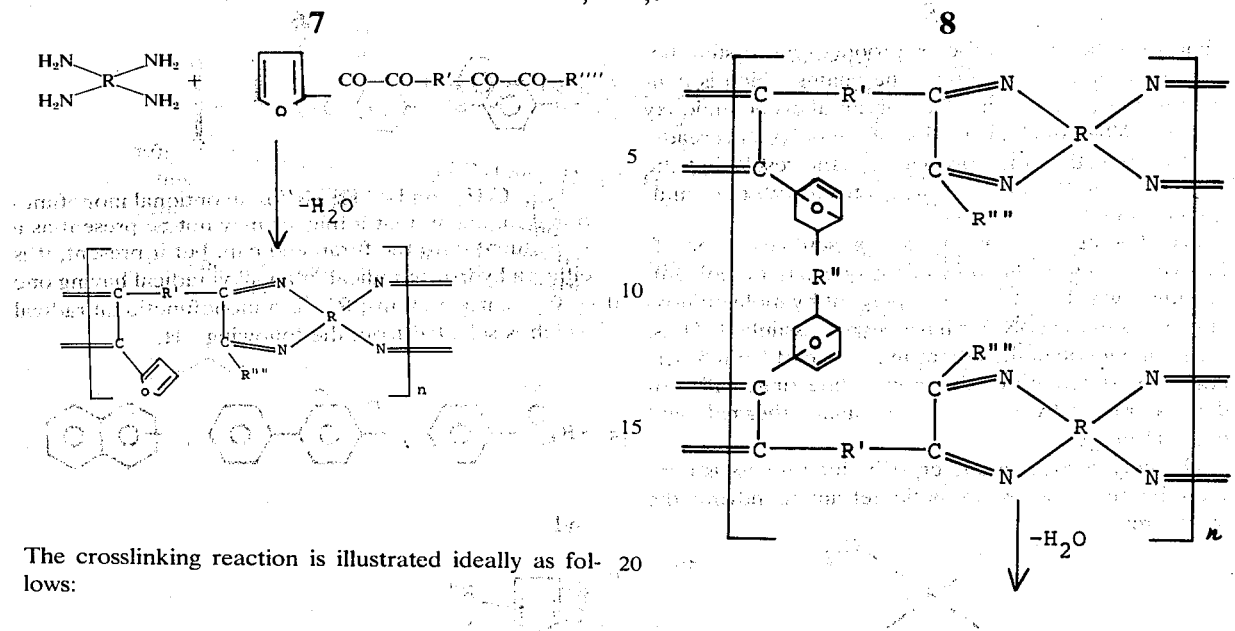
The crosslinking reaction is illustrated ideally as follows:
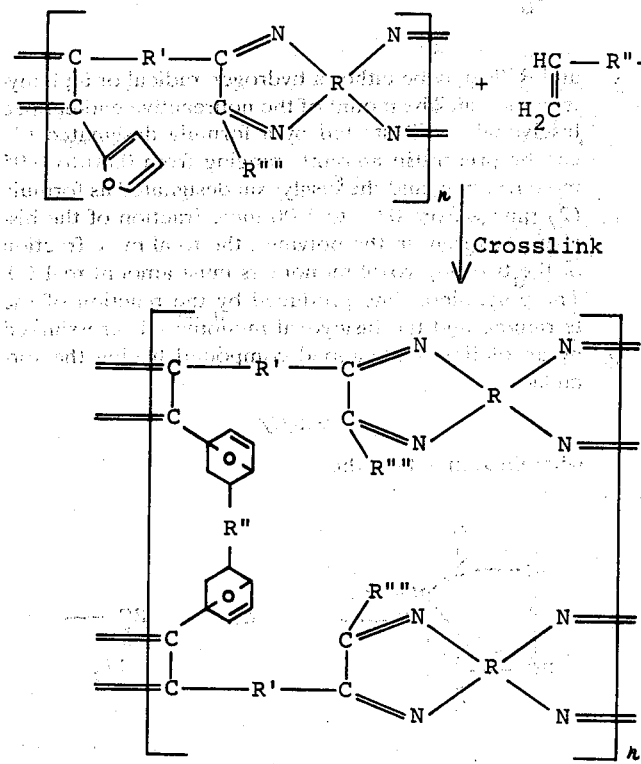
The aromatization in situ to produce the final polymer is illustrated ideally as follows:
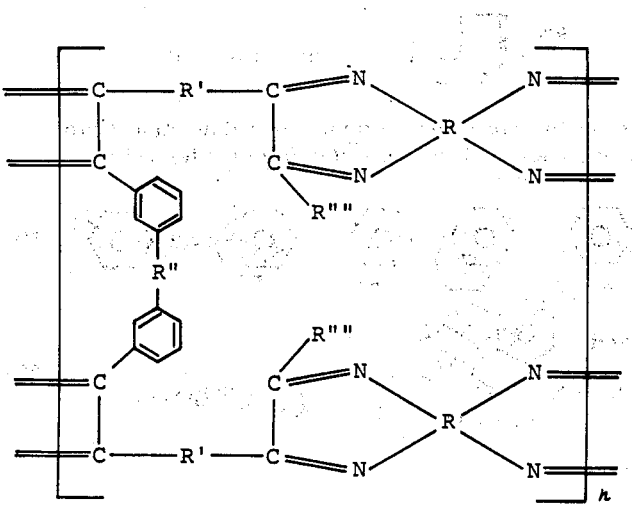

Although it is not critical, solvents may be used to reduce the viscosity of the reactants and facilitate mixing and fabrication. Generally, common solvents may be used, e.g., cresol, dimethylformamide, xylene, pyridine, dimethylsulfoxide, or N-methyl-2-pyrrolidine.

The invention will be more clearly understood by referring to the following example. This example illustrates specific embodiments and should not be construed as limiting the invention.

CROSSLINKING REACTION

A mixture of 0.557 g of polyquinoxaline (prepared above) and 0.036 g of bis(4-maleimidophenyl) methane was heated to 204°C. In 1 hour a gell was obtained. The solvent was removed from the polymer at reduced pressure and the polymer so isolated was placed in sulfuric acid to assess if crosslink formation occurred. The polymer was observed to swell in the acid but it was not soluble, indicating the formation of crosslinks.

The reaction may be illustrated:

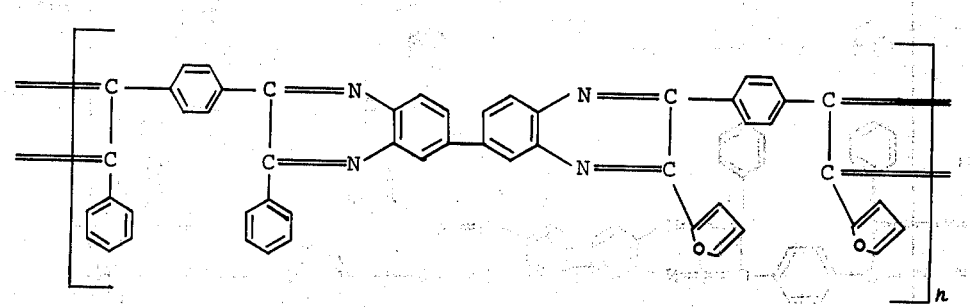

EXAMPLE

Preparation of Furane Containing Polyquinoxaline

To a slurry of 0.643 g (3 millimole) of diaminobenzidine in 7 g of a 1:1 mixture of xylene and m-cresol was added a mixture of 1.146 g (2.7 millimole) of oxybisbenzil and 0.097 g (0.3 millimole) of 1,4-bis(2-furylglyoxlyl) benzene during a two-minute period. An additional 3 g of solvent mixture was added and the reaction mixture was stirred under nitrogen for 18 hours. The viscous solution was then slowly added to 500 ml of methanol in a blender. The fiberous yellow solid was collected by filtration, boiled twice with methanol and dried in vacuo at 140°C to give 1.65 g of polymer.

The reaction may be illustrated:

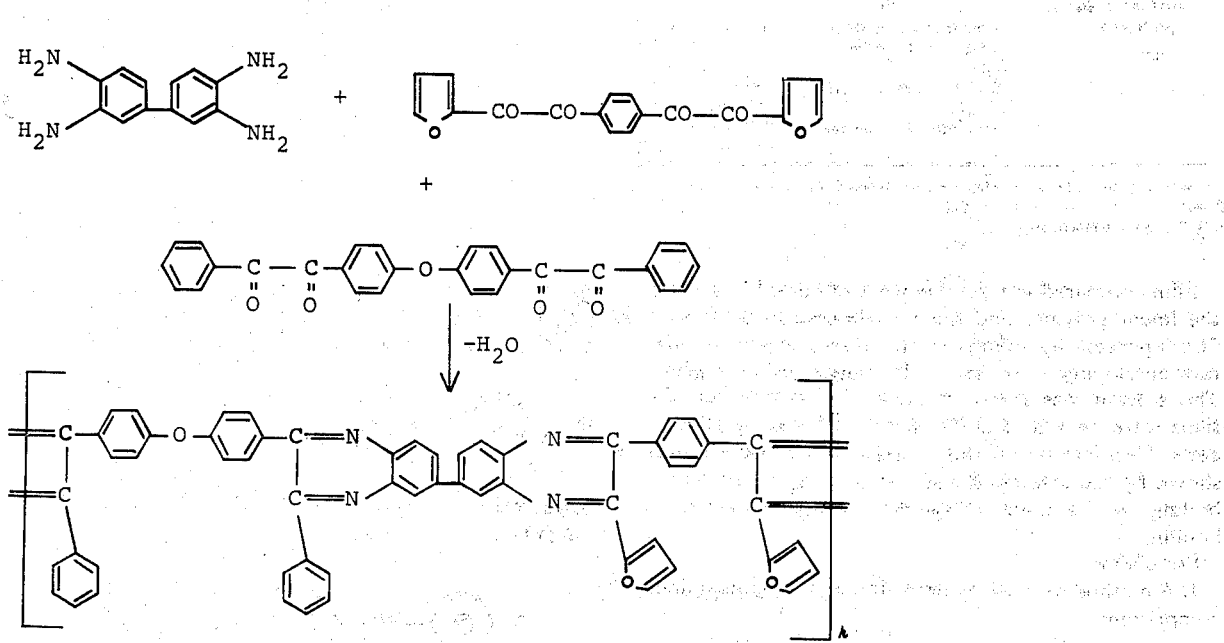

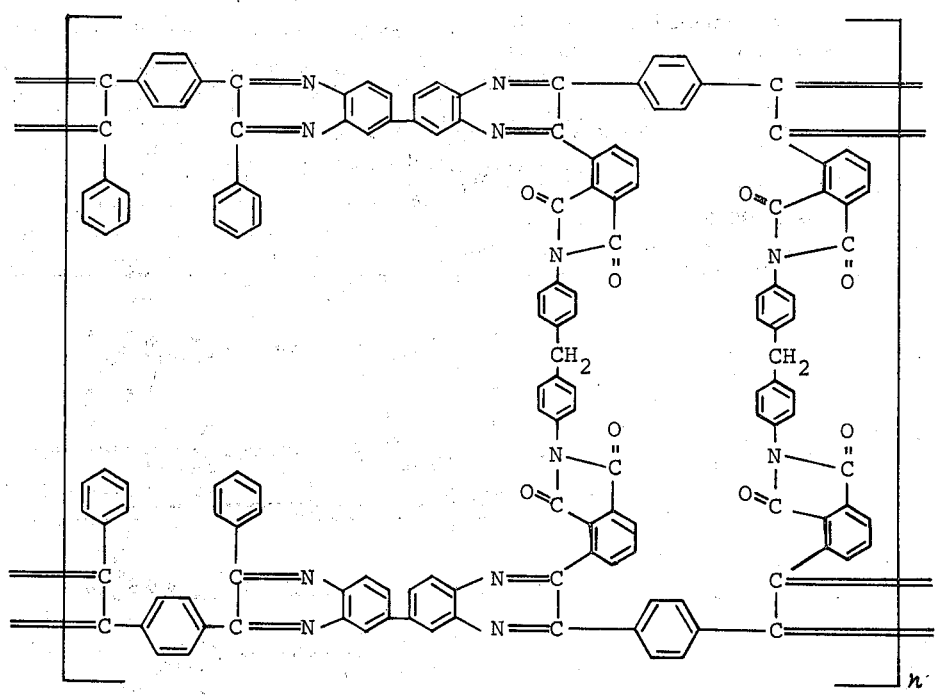

The crosslinked material was found to be insoluble in the original xylene/m-cresol solvent, and also it was insoluble in concentrated sulfuric acid.

The following table sets forth the film and adhesive properties of the polyquinoxaline which was prepared:

TABLE

| Polyquinoxaline PQ Product Form | Test | Property |
| --- | --- | --- |
| 1. 15% m/m* crosslinked film | Tensile strength/elongation | 15 Ksi/20% |
| | Apparent softening point | 600°F |
| | Color | Light amber |
| | Initial Thermo-oxidative stability | 515°C (958°F) |
| 2. Titanium Alloy 6A1-4V adhesive specimens | Lap shear strength | |
| | Linear polymer with 15% m/m Crosslink sites | 1000 psi at R.T.** 700 psi at 600°F |
| | 5% m/m Crosslinked | 2800 psi at R.T. 1200 psi at 600°F |
| | 15% m/m Crosslinked | 2000 psi at R.T. 1700 psi at 600°F |

*m/m = Mole percent of quinoxaline rings in the polymer processing crosslink sites or crosslinks.
**R.T. = room temperature Films prepared in the table were obtained by casting the linear polymer and the crosslinking agent from a 50/50 percent by volume m-cresol xylene solvent mixture employing a 10 percent by weight solids loading. The solvent was removed under vacuum, when the films were heated at 200°C for four hours to effect a cure. Verification of the crosslinked formation was shown by the insolubility of the resin film samples by boiling in the m-cresol/xylene solvent for over 72 hours.

We claim:

1. A method for making crosslinked polyquinoxalines comprising:

A. reacting (i) an aromatic tetraamine having the structure $$\begin{array}{c} H_2N \quad\quad NH_2 \\ R \\ H_2N \quad\quad NH_2 \end{array}$$

wherein R is a tetrafunctional radical selected from the group consisting of

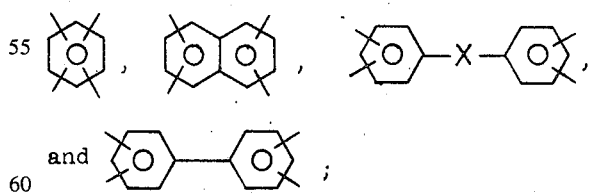

where X is selected from the group consisting of —O—, —CO—, —S—, —SO$_2$—,

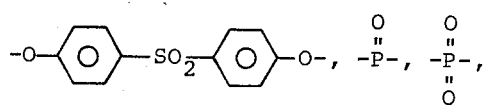

-CH$_2$-, -C$_2$H$_4$-, and —C$_3$H$_6$—; with (ii) an aromatic bis-glyoxal selected from the group consisting of (1) R''''—CO—CO—R'—CO—CO—R'''' and (2) 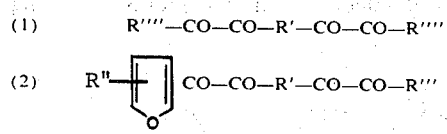

where R; is a difunctional aromatic radical selected from the group consisting of

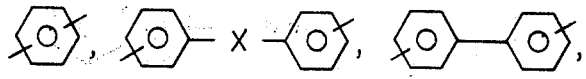

and ;

where X is selected from the group consisting of —O—, —S—, —CO—, —SO$_2$—,

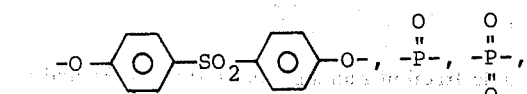

—CH$_2$—, —C$_2$H$_4$—, and —C$_3$H$_6$—; R'' is an optional monofunctional radical selected from the group consisting of hydrogen radical and alkyl radical having 1 to 4 carbon atoms; R''' is a monofunctional radical selected from the group consisting of —H,

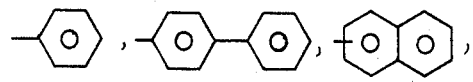

and

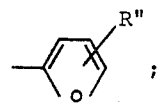

and R'''' is a monofunctional radical selected from the group consisting of —H and

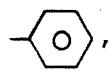

where the amount of (1) ranges from 0.00 to 0.95 and (2) ranges from 0.05 to 1.00 mole fraction of the bis-glyoxal, the total mole fraction of the aggregate amounting to unity; and (iii) one equivalent weight of an olefinic endcapped compound having the structure:

Z-R'-Z where Z is selected from the group consisting of

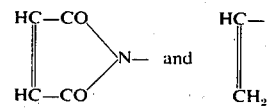 and 

for each equivalent weight of furan monomer whereby a polyquinoxaline is formed having a crosslink chain attached by alicyclic endooxy linkage at quinoxaline linkage sites;

B. heating the polyquinoxaline in a temperature range from 200°C to 300°C to aromatize the alicyclic endooxy linkage.

2. A crosslinked polyquinoxaline consisting essentially of the structure:

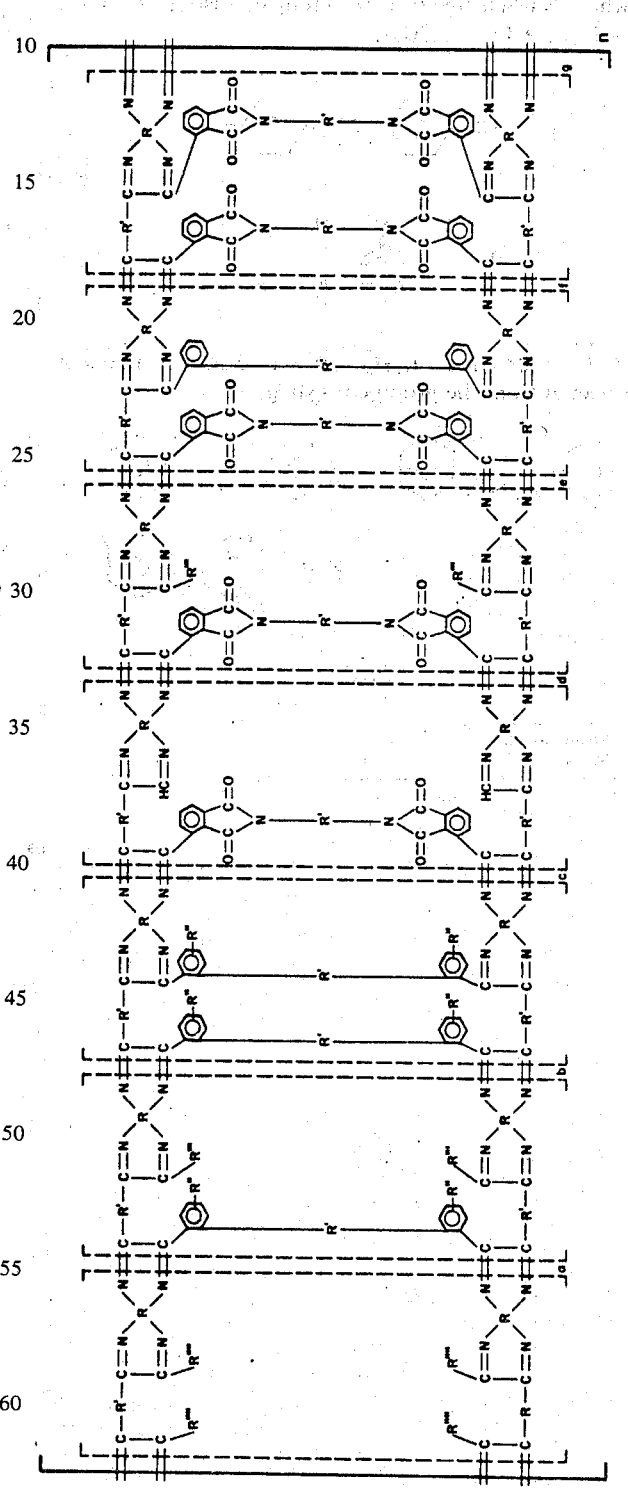

wherein R is a tetrafunctional radical selected from the group consisting of

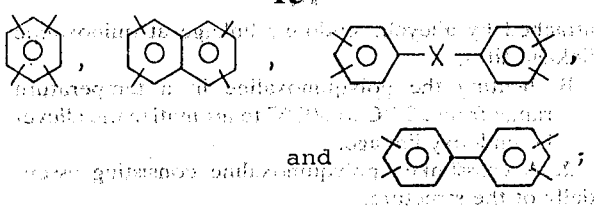

and where X is selected from the group consisting of —O—, —S—, —CO—, —SO$_2$—,

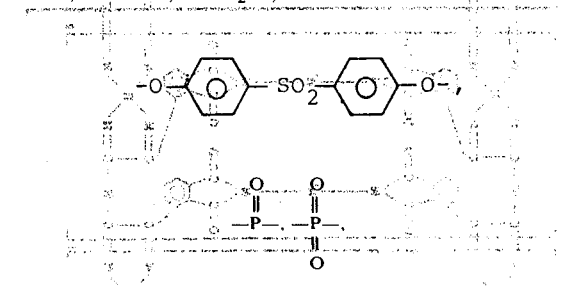

-CH$_2$-, -C$_2$H$_4$- and —C$_3$H$_6$—; R' is a difunctional radical selected from the group consisting of

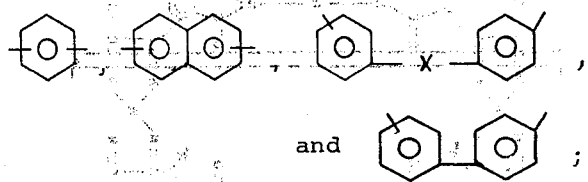

R'' is an optional monofunctional radical selected from the group consisting of hydrogen radical and alkyl radicals having 1 to 4 carbon atoms; R''' is a monofunctional radical selected from the group consisting of —H,

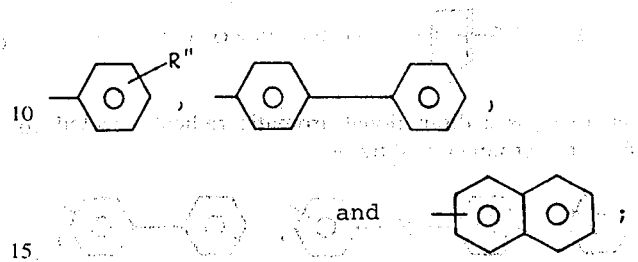

and R'''' is a monofunctional radical selected from the group consisting of —H and

a is a mole fraction ranging from 0.00 to 0.95 and b through g, respectively is a mole fraction ranging from 0.05 to 1.00 wherein the sum of the mole fractions is equal to unity; and n is an integer between 2 and 200.

* * * * *